Figure 1:
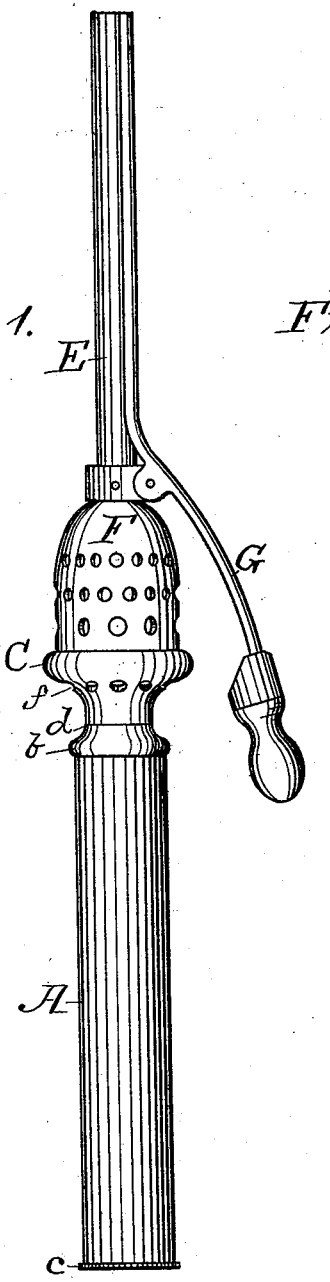

(No Model.)

J. A. RADFORD.
CURLING IRON.

No. 547,863. Patented Oct. 15, 1895.

Witnesses

Inventor
John Arthur Radford
Frank D. Thomason
By Attorney

UNITED STATES PATENT OFFICE.

JOHN ARTHUR RADFORD, OF CHICAGO, ILLINOIS.

CURLING-IRON.

SPECIFICATION forming part of Letters Patent No. 547,863, dated October 15, 1895.

Application filed June 7, 1895. Serial No. 551,948. (No model.)

*To all whom it may concern:*

Be it known that I, JOHN ARTHUR RADFORD, a citizen of the United States, and a resident of Chicago, Cook county, Illinois, have invented certain new and useful Improvements in Curling-Irons, of which the following is a full, clear, and exact description, reference being had to the accompanying drawings, and to the letters of reference marked thereon.

The object of my invention is to provide a self-heating curling-iron the handle of which does not become heated and volatilize the alcohol or combustible contained therein. I accomplish this by wholly insulating the burner and the curling-iron proper from the handle. I am aware that curling-irons have been made in which insulating material has been interposed between the curling-iron proper and the handle. In these irons, however, the insulating material is so disposed of that the object sought for is not effectually accomplished, or it is so utilized that the manufacture of the iron is difficult, and it is defective from the start, or soon becomes useless by reason of needed repairs. I avoid these objections by my improvements, substantially as hereinafter described, or as illustrated in the drawings, in which—

Figure 2:
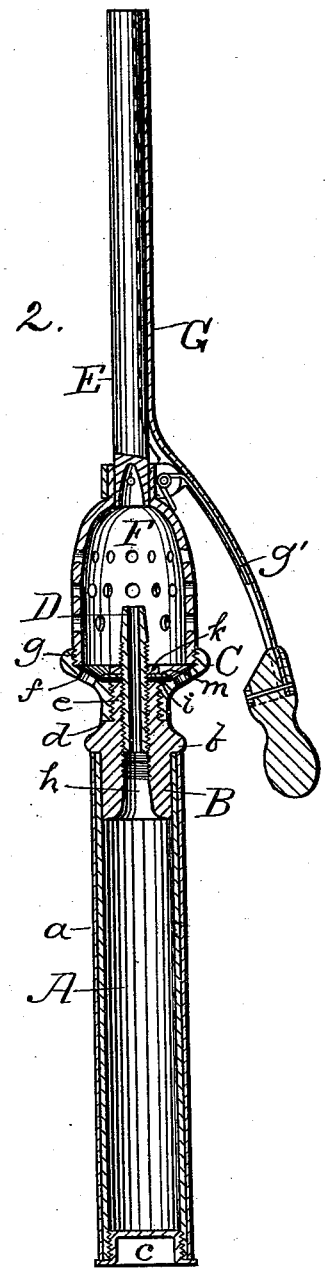

Figure 1 is a side view of my invention, and Fig. 2 is a longitudinal central section therethrough.

My invention is more particularly to be considered as an improvement on Letters Patent of the United States, granted April 2, 1895, to G. M. Pitner, for improvements in curling-irons, and numbered 536,839, although it is equally applicable to all curling-irons in which it is desired to insulate the handle from the curling-iron or mandrel.

Reference being had to the drawings, A represents a tubular handle having a covering *a* of bookbinders' cloth or other suitable material to improve its appearance and having one end interiorly screw-threaded and closed by a removable stopper *c*. The other end of this handle is permanently closed by a plug B, of vulcanized fiber or other hard insulating material, which is driven into said tube until the shoulder (made by providing the same with a circumferential flange *b*) bears tightly against and seals said end of the handle. I prefer to gradually reduce the diameter of the portion of the plug extending out of the tubular handle, so as to provide a suitable neck between the curling-iron proper and said handle. At the point where the diameter of the plug B is the smallest, or about the center of length of the neck, it is stepped to a less diameter, so as to provide a shoulder *d*, and the portion *e* from this shoulder to its extremity is exteriorly-screw-threaded to receive the interiorly-screw-threaded smaller cylindrical-shaped end of the metal holder C. The upper portion of this holder C flanges outward, so as to increase its diameter to about twice that of its lower portion, and has a series of holes or openings *f* in the portion thereof between its lower screw-threaded portion and its greatest diameter, and has its upper edges *g* upturned and interiorly screw-threaded. There extends longitudinally through the plug an opening *h*, and screwed into this opening from the top thereof is a metallic wick-tube D. The exterior of this wick-tube D is screw-threaded with the exception of its upper end, and I surround the wick-tube at the point where it enters the plug with a washer *i* of insulating material, which is held in place against the plug (which it slightly exceeds in diameter) and against the holder C by a nut *k*, between which latter and said washer *i*, I prefer to interpose a metallic washer *m*.

The principal feature of my invention resides in the construction of the plug and holder and conjunctive devices whereby the handle containing the combustible is prevented from becoming heated to such an extent by the curling-iron proper or mandrel E and burner or wick-tube D as to volatilize the combustible or render the handle uncomfortable to the touch. It is of course possible to dispense with screw-threading the wick-tube, and it is likewise possible to dispense with the use of washers *i* and *m* and nut *k*. For obvious reasons, however, it is preferred to thread the tube D and to use washer *i* in order to make a more perfect article for toilet use.

The curling-iron or mandrel E has the end F, connecting with the holder, made of a perforated bowl shape. The edges of the open mouth of this bowl-shaped end F are exteriorly screw-threaded and are screwed into the holder C, thus connecting the iron to the handle. Pivotally connected to the smaller closed end of this perforate bowl-shaped end F is a clamp G, which is kept by a suitable spring $g'$, normally bearing against the iron. This clamp is used in conjunction with said iron in the usual well-understood manner during the process of curling the hair.

In operation I fill the hollow handle with alcohol or cotton waste saturated with alcohol and run a suitable wick through the central passage $h$ made with reference thereto in the burner, and then lighting the wick screw the bowl-shaped end of the iron F onto the holder K of the burner. The blaze from the wick is thus thoroughly protected and guarded so that it cannot come in contact with nor singe the hair, and yet will have plenty of air and not be liable to smother and die out. The construction of the holder affords more air-space and permits a better circulation of air through the openings in the holder than has been accomplished, and thus improves the air-supply to the flame and remains cooler than in previously-existing constructions.

What I claim as new is—

The combination in a curling iron with a mandrel having a perforate bowl-shaped end, and a clamp suitably pivoted thereto, of a tubular handle having its butt end closed by a suitable stopper, a plug of hard insulating material closing its other end, having its outer extremity screw-threaded and provided with a longitudinal central wick opening therethrough, a wick-tube screwed into the other end of said wick-opening, and a metallic holder screwed onto the screw-threaded outer portion of said insulating plug having air-openings in its flanged portion and having the perforate bowl-shaped part of the mandrel coupled thereto.

JOHN ARTHUR RADFORD.

Witnesses:
SAMUEL E. THOMASON,
FRANK D. THOMASON.